US006452287B1

(12) United States Patent
Looker

(10) Patent No.: US 6,452,287 B1
(45) Date of Patent: Sep. 17, 2002

(54) WINDMILL AND METHOD TO USE SAME TO GENERATE ELECTRICITY, PUMPED AIR OR ROTATIONAL SHAFT ENERGY

(76) Inventor: Ivan Looker, 2100 E. Raymond Rd., Watseka, IL (US) 60970

(*) Notice: Subject to any disclaimer, the term of this patent is extended or adjusted under 35 U.S.C. 154(b) by 0 days.

(21) Appl. No.: 09/592,887

(22) Filed: Jun. 13, 2000

Related U.S. Application Data

(60) Provisional application No. 60/139,000, filed on Jun. 14, 1999.

(51) Int. Cl.$^7$ ................................................. F03D 9/00
(52) U.S. Cl. ............................ 290/55; 290/44; 290/52; 416/4; 416/179
(58) Field of Search .............................. 290/55, 44, 43, 290/54, 52; 415/2.1, 43, 148; 416/9, 179, 171, 170 R, 89, 10, 189, DIG. 4

(56) References Cited

U.S. PATENT DOCUMENTS 1,233,232 A   7/1917 Heyroth .................. 290/55
1,465,174 A   6/1922 Porter .................... 416/13

(List continued on next page.)

FOREIGN PATENT DOCUMENTS

| DE | 3339462 | * | 5/1984 |
| DE | 3244719 | * | 6/1984 |
| DE | 3402035 | * | 7/1985 |
| DE | 3638129 | * | 5/1988 |
| EP | 00115131 | * | 3/1980 |
| FR | 24851064 A | * | 12/1981 |

OTHER PUBLICATIONS

Standard Handbook for Mechanical Engineers ( McGraw–Hill ) 7th Ed. 1967. pp. 9–8 thru 9–13, Article on Windmills by E.N. Fales. A copy is attached.
Article from Machine Design magazine, May 20, 1976, p. 18–25 Something in the Wind? ERDA thinks so ) by T. W. Black.
Article from Machine Design magazine, Jun. 10, 1976, p. 26 thru 32. "Advanced Turbine Designs Boost Windpower Potential" by Theodore W. Black.
Owners Manual—Airwind Module and Air Marine ( Windmills) Southwest Windpower Inc., Flagstaff, AZ 86004.
David Anderson and Scott Eberhardt, *Sport Aviation*, "How Airplanes Fly: A Physical Description of Lift", Feb. 1999, pp. 85–95.

*Primary Examiner*—Joseph Waks
(74) *Attorney, Agent, or Firm*—Brinks Hofer Gilson & Lione

(57) ABSTRACT

An improved windmill and a method for generating electricity, pumped air or rotational shaft energy are provided. A vertical mast rotatably mounts one end of a substantially horizontal and upward cantilevered support arm whose other end mounts a horizontal axis stator of dual function for both the windmill and the energy generating mechanism. A rotor is mounted co-axially to the stator, being the rotor for both the windmill blades and the energy generating mechanism. Fixed windmill blades or blades which lessen angle of attack in response to increasing wind pressure are attached to the rotor. A fan shroud in the form of a band supported by fins from the stator may encircle a disk defined by the tips of the rotating windmill blades.

12 Claims, 4 Drawing Sheets

U.S. PATENT DOCUMENTS

| | | | | |
|---|---|---|---|---|
| 1,944,239 A | | 1/1934 | Honnef | 290/55 |
| 4,075,500 A | * | 2/1978 | Oman et al. | 290/55 |
| 4,140,433 A | * | 2/1979 | Eckel | 415/209.1 |
| 4,183,717 A | * | 1/1980 | Yamada | 416/121 |
| 4,237,384 A | * | 12/1980 | Kennon | 290/55 |
| 4,288,704 A | * | 9/1981 | Bosard | 290/55 |
| 4,291,235 A | | 9/1981 | Bergy, Jr. et al. | 290/55 |
| 4,324,985 A | * | 4/1982 | Oman | 290/55 |
| 4,366,779 A | * | 1/1983 | Knecht | 122/26 |
| 4,367,413 A | * | 1/1983 | Nair | 290/52 |
| 4,385,871 A | * | 5/1983 | Beisel | 417/334 |
| 4,444,543 A | * | 4/1984 | Wilks et al. | 416/170 R |
| 4,613,279 A | | 9/1986 | Corren et al. | 415/2 A |
| 4,648,801 A | * | 3/1987 | Wilson | 416/171 |
| 4,671,742 A | * | 6/1987 | Gyimesi | 417/131 |
| 4,720,640 A | * | 1/1988 | Anderson et al. | 290/43 |
| 5,315,159 A | * | 5/1994 | Gribnau | 290/55 |
| 5,506,453 A | | 4/1996 | McCombs | 290/44 |
| 5,599,172 A | * | 2/1997 | McCabe | 417/334 |
| 5,669,758 A | | 9/1997 | Williamson | 416/4 |
| 5,746,576 A | * | 5/1998 | Bayly | 416/16 |
| 5,844,324 A | * | 12/1998 | Spriggle | 290/55 |
| 5,910,688 A | * | 6/1999 | Li | 290/55 |
| 6,064,123 A | * | 5/2000 | Gislason | 290/55 |
| 6,127,739 A | | 10/2000 | Kari Appa | 290/55 |
| 6,177,735 B1 | * | 1/2001 | Chapman et al. | 290/44 |
| 6,285,090 B1 | * | 9/2001 | Brutsaert et al. | 290/55 |

* cited by examiner

WINDMILL AND METHOD TO USE SAME TO GENERATE ELECTRICITY, PUMPED AIR OR ROTATIONAL SHAFT ENERGY

This application claims benefit of provisional No. 60/139,000 filed Jun. 14, 1999.

BACKGROUND OF THE INVENTION

1. Field of the Invention

This invention is a lower cost more efficient windmill which operates over a wider spectrum of wind speeds than existing windmills, thereby placing energy production within the reach of individuals.

2. Description of the Related Art

Horizontal axis windmills have not basically changed for about a thousand years. Such windmills still consist of a group of sails (now called blades) affixed radially to a rotating shaft. No economically feasible structure has been implemented to dramatically increase efficiency. Present windmills are not economically feasible unless placed in the few mountain passes or ridge locations where high winds blow much of the time. Even in those few high wind locations the windmills must be of very large diameter, therefore expensive, heavy and high maintenance, and must be stopped to avoid damage in winds above approximately 35 mph. The above shortcomings of prior art windmills have kept wind power from furnishing a substantial portion of energy needs.

BRIEF SUMMARY OF THE INVENTION

The windmill according to this invention includes a support arm horizontally pivoting from one of its ends upon a vertical axis bearing atop a mounting mast, the other end of the support arm fixedly supporting a stator providing both windmill stator functions and generating mechanism stator functions. The stator also supports airflow straightening fins extending radially from the stator close in front of the windmill blades, the outer end of the fins supporting a shroud band encircling the fan just outside the tips of the rotating blades. The stator mounts a coaxial horizontal axis dual function rotor which furnishes windmill blade rotor function as well as energy generating rotor functions, whether for electricity, air pumping or rotating shaft energy.

The objects of this invention follow:

Eliminate efficiency loss from vortex generation at each blade tip.

Eliminate efficiency loss due to induced spiral flow in front of the blade disk.

Eliminate weight, cost and efficiency penalties by providing a single simple low cost support arm which performs the five functions of supporting the windmill, aligning it into the wind, elevating it downwind above mounting mast turbulence, contribute to the elimination of induced spiral air circulation in front of the blade disk, and provide a conduit for transmitting the energy produced to the mounting mast.

Eliminate weight and cost penalties by providing a single dual function stator which provides both windmill stator functions and energy producing mechanism stator functions.

Eliminate weight and cost penalties by providing a single dual function rotor which provides both windmill rotor functions and energy generation rotor functions.

Eliminate energy loss by not using a separate transmission device such as shafts, bearings and gears, between the windmill rotor and the energy generating device.

Eliminate weight and cost penalties, by not needing any device to stop the windmill from operating in any high wind.

Gain efficiency by being able to harvest more low velocity winds as well as all high velocity winds.

Eliminate energy loss by having the windmill less sensitive to the effects of wind gusts.

All or most of the above-named inefficiencies and penalties are inherent in present state-of-the-art windmills now being manufactured and used.

DETAILED DESCRIPTION OF THE INVENTION

Figure 1:
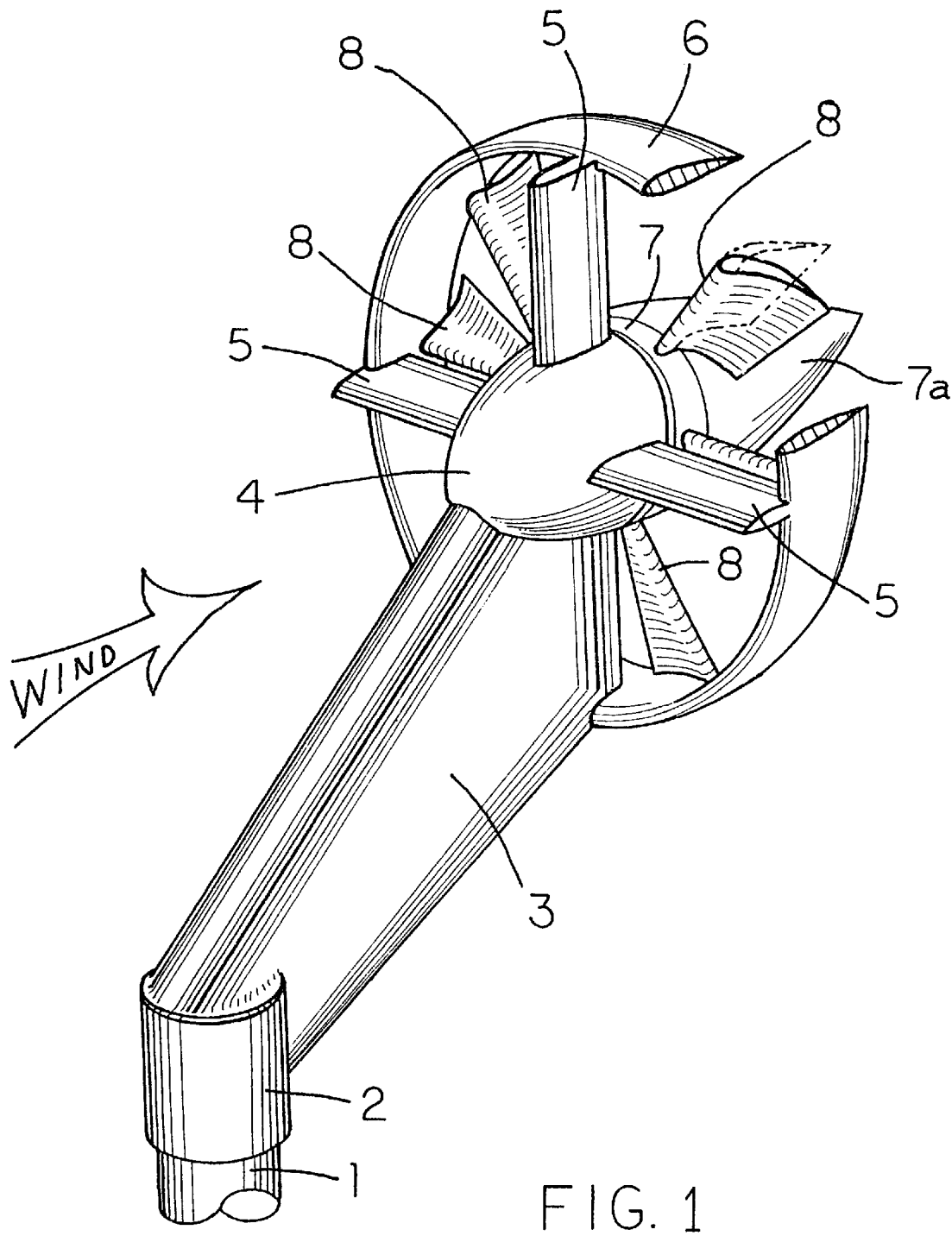
FIG. 1 is a perspective view of this invention with part of shroud band cut away to show changeable angle of attack of blades.

Referring to FIG. 1, the windmill according to this invention swivels with the wind direction horizontally around vertical support mast 1 by being affixed to rotatable mounting 2.

Support arm 3 extends outward and upward to support stator 4 above wind turbulence from mast 1. In this embodiment, support arm 3 is widened vertically as it extends away from its rotatable mounting 2 so that the lower downwind portion of support arm 3 also serves as a support for shroud band 6. Shroud band 6 is also supported in this embodiment by the three fins 5 which get their support from stator 4. Shroud band 6 encircles a disk defined by the tips of the rotating blades 8. Rotor 7 coaxially mounts to the downwind side of stator 4. Rotor 7 mounts fairing 7a in order to facilitate air flow through the windmill. Shroud band 6 is partially cut away to show more fully one of the windmill blades 8 along with a change of angle of attack under high wind pressure as shown by phantom dotted outline. Such change of angle of attack may obviously be accomplished by various known conventional spring and pivot mechanisms not shown.

Figure 2:
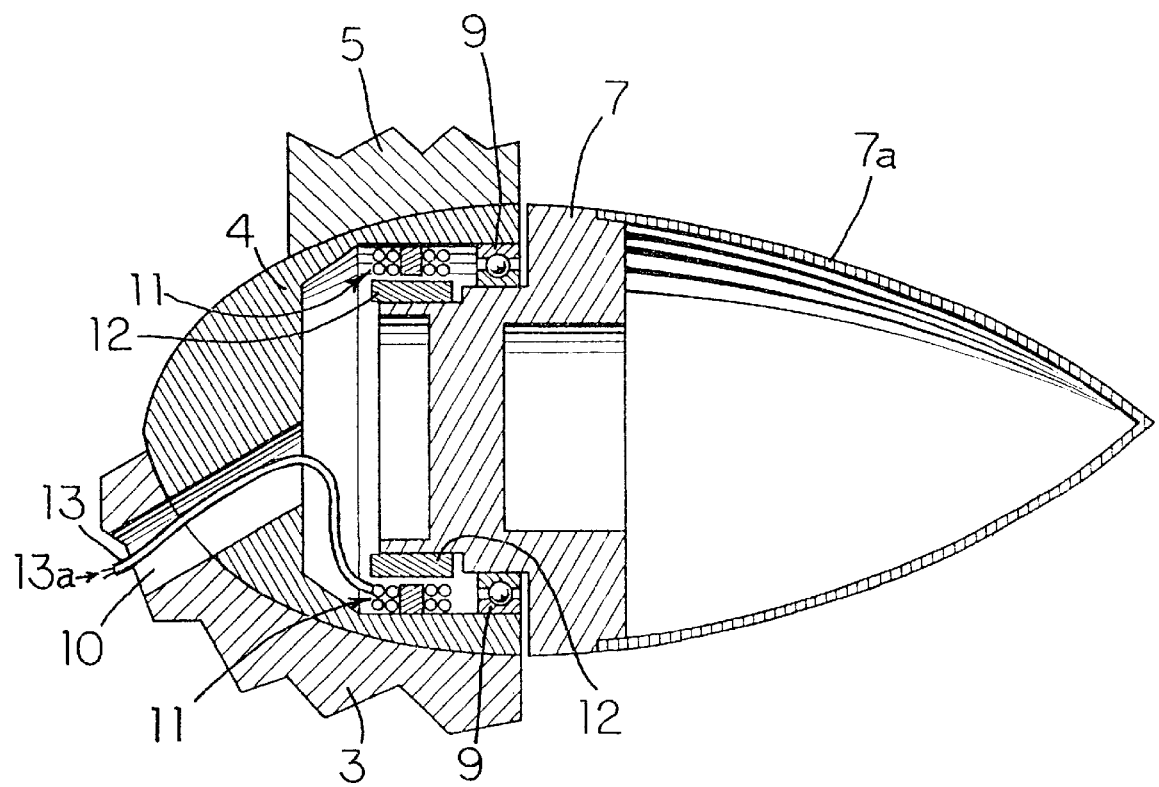
FIG. 2 is a vertical cross section of stator and rotor along the axis of rotor rotation, showing one preferred installation of electrical generator parts within the dual function stator and dual function rotor.

FIG. 2 shows a vertical cross section of the stator 4, and rotor 7 and fairing 7a assembled by means of bearing 9. A lower fragmentary portion of vertical fin 5 is shown where it attaches to stator 4.

A fragmentary portion of the downwind portion of support arm 3 is shown where it supports stator 4. The conduit 10 is a cylindrical bore passing through support arm 3 and stator 4 in order to carry cable 13 with wires 13a to conduct electricity to and through rotatable mounting 2 by way of conventional slip rings not shown, and thence down vertical mast 1 to ground usage.

A plurality of windings 11 are shown supported by stator 4. A plurality of magnets 12 are shown supported by rotor 7.

The electricity generated within the windings 11 is conducted away from the generator by cable 13, having in this embodiment two wire conductors 13a.

Since there is no vertically oriented blade 8 in FIG. 1, no blade is shown in FIG. 2 which is vertical cross section of the windmill as shown in FIG. 1. However, various conventional means of blade attachment are available, and are not subject of this invention and are not shown.

Figure 3:
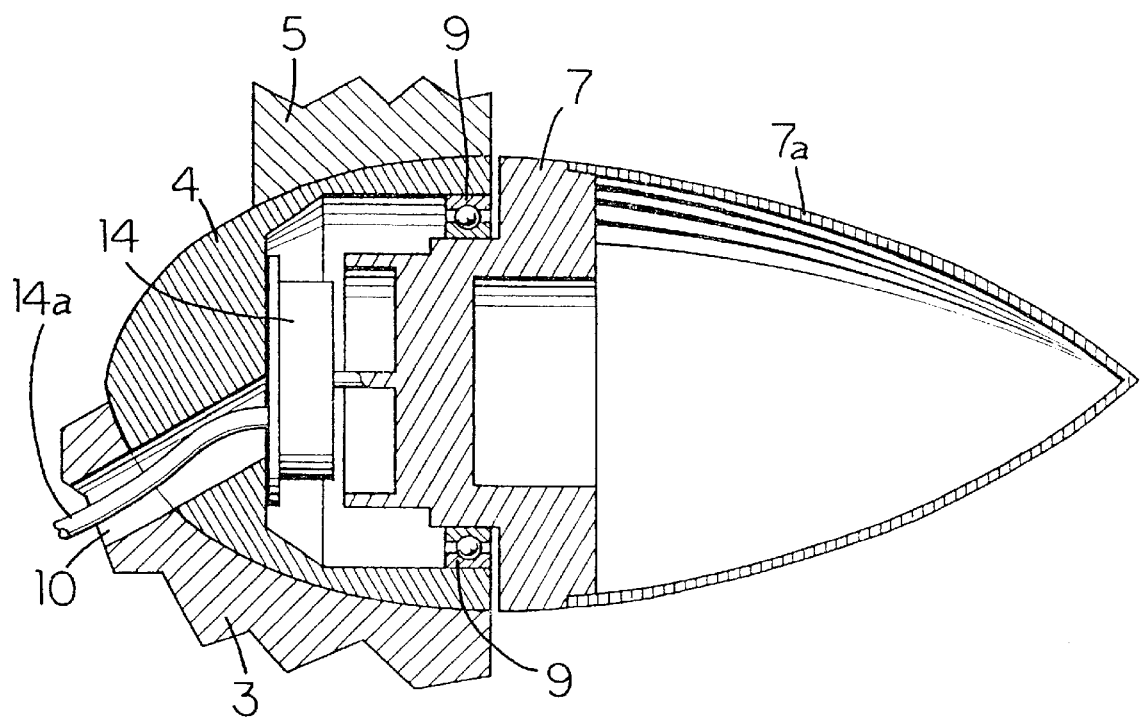
FIG. 3 is a vertical cross section of stator and rotor along the axis of rotor rotation, showing one preferred installation of air pumping parts within the dual function stator and dual function rotor.

FIG. 3 is similar to FIG. 2 except instead of electrical generation parts, FIG. 3 shows an air pump 14 mounted upon stator 4 and a pump drive shaft 14b driven by rotor 7, with air or vacuum delivery tube 14a traversing through conduit 10.

Figure 4:
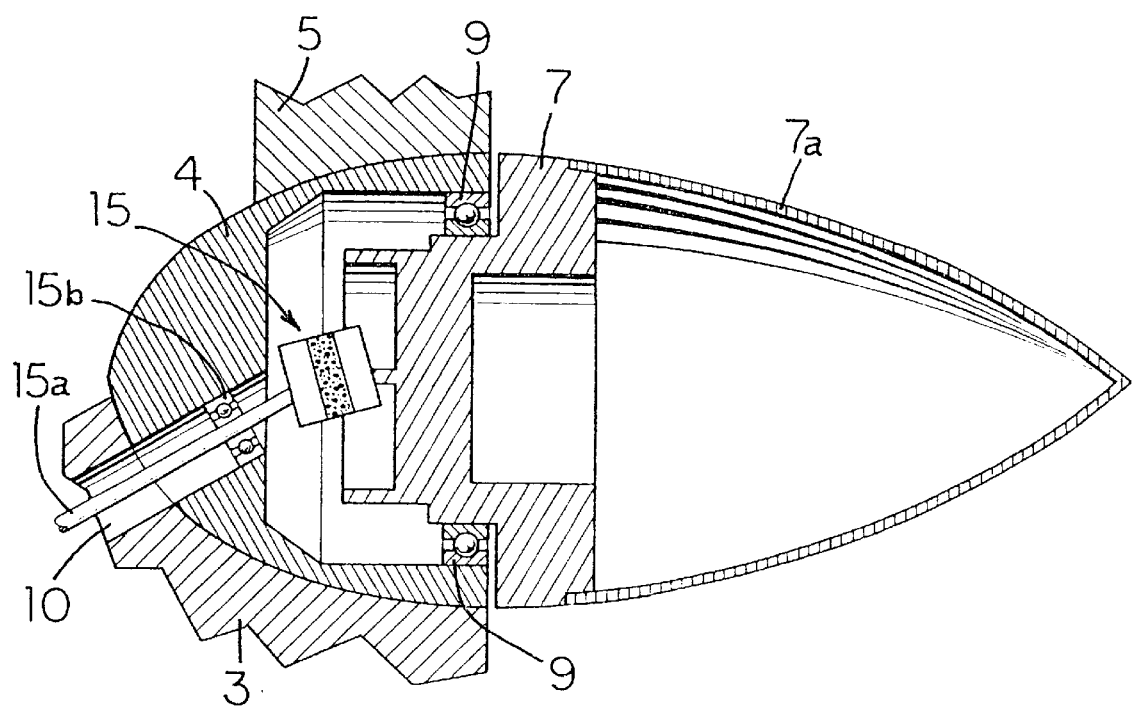
FIG. 4 is a vertical cross section of stator and rotor along the axis of rotor rotation, showing one preferred installation of rotating shaft energy parts within the dual function stator and dual function rotor.

FIG. 4 is similar to FIG. 2 and FIG. 3 except instead of showing electrical generating or air pumping parts, FIG. 4 shows rotating shaft power transmitting parts, namely flexible coupling 15 driven by rotor 7, thence driving shaft 15a supported in conduit 10 by bearing 15b.

What is claimed is:

1. A horizontal axis multi-bladed windmill for generating electricity, pumped air, or rotational shaft energy comprising:
    a substantially horizontal support arm having one end rotatably mounted upon a vertical mast and another end rigidly mounted to a horizontal-axis dual function stator,
    said stator integrally combining a support for both; windmill non-rotary elements including one of shroud and airflow straightening fins, and non-rotary elements of an energy generating mechanism,
    a dual function rotor rotatably mounted horizontally and co-axially upon a side of said stator opposite said support arm, said rotor integrally combining both; a windmill rotary support for multiple radially mounted blades and rotary elements of said energy generating mechanism;
    said blades having a first and a second end, the first end being located nearer to the axis of rotation of the rotor than the second end, said energy generating mechanism being located nearer to the first end of the blades than to the second of the blades, and said stator and said support arm being positioned upwind relative to the position of said rotor.

2. The windmill of claim 1 comprising;
    said shroud being a band shaped shroud supported from said support arm or said stator or both, said shroud encircling an outside circumference of a disk defined by the rotating windmill blades.

3. The windmill of claim 1 wherein;
    said windmill blades are mounted to said rotor with means to allow said blades to change an angle of attack with an increasing wind pressure.

4. The windmill of claim 1 wherein;
    said non-rotary elements of said energy generating mechanism comprising permanent magnets and,
    said rotary elements of said energy generating mechanism comprising windings for generating electricity.

5. The windmill of claim 1 wherein;
    said non-rotary elements of said energy generating mechanism comprising windings for generating electricity and,
    said rotary elements of said energy generating mechanism comprising permanent magnets.

6. The windmill of claim 1 wherein;
    said non-rotary elements of said energy generating mechanism comprising tubing and an air pump; and
    said rotary elements of said energy generating mechanism comprising a pump drive shaft mounted on said rotor.

7. The windmill of claim 1 wherein;
    said rotary elements of said energy generating mechanism comprising a drive shaft and coupling.

8. The windmill of claim 1, wherein said support arm comprises a substantially flat vertical plate that widens vertically as it extends away from said vertical mast and toward said dual function stator.

9. The windmill of claim 1, wherein said support arm has a downwind end and an upwind end, and wherein said dual function stator is rigidly mounted to said downwind end of the support arm.

10. A horizontal axis multi-bladed windmill for generating electricity, pumped air, or rotational shaft energy comprising:
    a substantially horizontal support arm having an upwind end and a downwind end;
    a vertical mast, wherein said upwind end of said arm is rotatably mounted upon said vertical mast;
    a horizontal axis stator having an upwind end and a downwind end, wherein said upwind end of said stator is rigidly mounted to said downwind end of said arm;
    airflow straightening fins extending radially from said stator;
    a rotor rotatably mounted horizontally and co-axially upon said downwind side of said stator;
    an energy generating mechanism comprising non-rotary elements and rotary elements, said non-rotary elements of said energy generating mechanism supported by said stator, and said rotary elements of said energy generating mechanism supported by said rotor;
    a plurality of windmill blades rotatably supported by said rotor, said blades having an inner end and an outer end, said inner end of said blades being located nearer to an axis of rotation of said rotor than said outer end of said blades, and said energy generating mechanism being located nearer to said inner end of said blades than said outer end of said blades.

11. The windmill of claim 10 further comprising a band shaped shroud mounted on said airflow straightening fins.

12. The windmill of claim 10, wherein said support arm comprises a substantially flat vertical plate that widens vertically as it extends away from said vertical mast and toward said stator.

* * * * *